Figure 1:
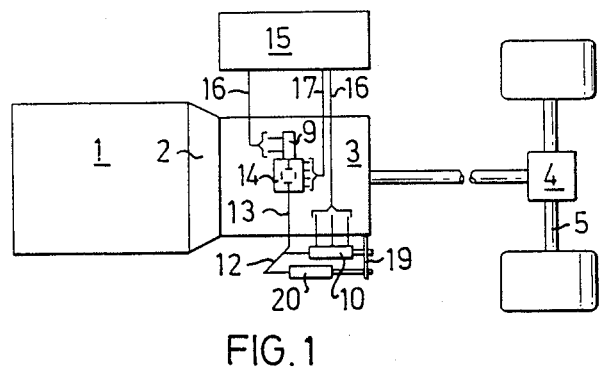

United States Patent [19]

Nilsson

[11] Patent Number: 4,817,766
[45] Date of Patent: Apr. 4, 1989

[54] ARRANGEMENTS FOR DAMPING SHIFTING MOVEMENTS IN TRANSMISSIONS

[75] Inventor: Nils H. Nilsson, Nykvarn, Sweden

[73] Assignee: Saab-Scania Aktiebolag, Sodertalje, Sweden

[21] Appl. No.: 166,737

[22] Filed: Mar. 2, 1988

Related U.S. Application Data

[63] Continuation of Ser. No. 4,311, Jan. 7, 1987, abandoned, which is a continuation of Ser. No. 746,329, Jun. 19, 1985, abandoned.

[30] Foreign Application Priority Data

Jun. 21, 1984 [SE] Sweden ............................... 8403329

[51] Int. Cl.[4] .................. B60K 20/00; F16F 9/50; G05G 9/00; G05G 13/00
[52] U.S. Cl. ............................ 188/281; 74/335; 74/473 R; 188/280; 188/312; 188/315; 188/317; 188/318; 188/322.15; 267/64.15
[58] Field of Search ............. 74/335, 473 R; 192/109; 16/51, 56, 82, 84, 71; 188/270, 280, 287, 311-318, 322.13-322.19; 267/113, 118, 122, 124-129, 221, 226, 195, 217, 64.15, 64.11-64.28

[56] References Cited

U.S. PATENT DOCUMENTS

| | | | |
|---|---|---|---|
| 1,833,121 | 11/1931 | Norton | 16/56 X |
| 2,011,460 | 8/1935 | Snyder | 188/285 |
| 2,186,797 | 1/1940 | Beattie | 192/109 D X |
| 2,310,570 | 2/1943 | Briggs | 188/282 |
| 2,586,135 | 2/1952 | Woodruff | 16/51 |
| 2,604,953 | 7/1952 | Campbell | 188/286 X |
| 2,853,159 | 9/1958 | Kuhn, Jr. | 188/312 X |
| 2,972,045 | 2/1961 | Bush | 188/285 X |
| 3,131,921 | 5/1964 | Karbowniczek | 188/312 X |
| 3,201,110 | 8/1965 | Taccone | 188/287 X |
| 3,228,632 | 1/1966 | Hunth | 188/312 X |
| 3,461,991 | 8/1969 | Arendarski | 188/282 |
| 3,465,851 | 9/1969 | Callegari et al. | 188/312 |
| 3,483,952 | 12/1969 | Cardwell | 188/312 |
| 3,583,422 | 6/1971 | Dach et al. | 137/505.14 X |
| 3,647,199 | 3/1972 | Bhutani et al. | 267/124 |
| 3,896,908 | 7/1975 | Petrak | 188/280 |
| 3,929,057 | 12/1975 | Kondo | 188/318 X |
| 3,954,027 | 5/1976 | Söderberg et al. | 74/473 P |
| 3,972,396 | 8/1976 | Bochnak | 188/312 |
| 4,026,169 | 5/1977 | Kühnle et al. | 74/335 X |
| 4,084,668 | 4/1978 | Rybicki | 188/318 X |
| 4,220,217 | 9/1980 | Kobayashi | 74/473 R X |
| 4,275,618 | 6/1981 | Bale | 74/473 R X |
| 4,287,784 | 9/1981 | Cedendahl | 74/473 R |
| 4,307,623 | 12/1981 | Cavallero et al. | 74/473 R |
| 4,323,356 | 4/1982 | Stephenson | 74/473 R X |
| 4,353,430 | 10/1982 | Sjöqvist et al. | 74/512 X |
| 4,503,951 | 3/1985 | Imaizumi | 188/322.15 X |
| 4,524,633 | 6/1985 | Murata et al. | 74/473 R |
| 4,588,053 | 5/1986 | Foster | 188/282 X |
| 4,597,306 | 7/1986 | Tsuji | 74/473 R X |
| 4,726,249 | 2/1988 | Inuzuka et al. | 74/473 R X |
| 4,742,724 | 5/1988 | Jimbo et al. | 74/473 R X |

FOREIGN PATENT DOCUMENTS

| | | | |
|---|---|---|---|
| 340261 | 2/1935 | Italy | 188/287 |
| 681289 | 10/1952 | United Kingdom . | |
| 749363 | 5/1956 | United Kingdom . | |
| 1319969 | 6/1973 | United Kingdom . | |
| 2122305A | 1/1984 | United Kingdom . | |

Primary Examiner—Douglas C. Butler
Attorney, Agent, or Firm—Cushman, Darby & Cushman

[57] ABSTRACT

The invention relates to an arrangement for damping shifting movements in a mechanical, synchronized multispeed transmission. Where such shifting movements are performed with the aid of a servo-mechanism, for exmaple a pneumatic piston cylinder unit, there is the risk that the gear teeth will be damaged when brought into engagement with each other. In the arrangement according to the invention, a pressure medium-filled damper is used without any communication with a separate pressure medium reservoir, thus eliminating the risk of malfunction due to foam formation in the pressure medium as well as achieving a desirable damping of the shifting movement. The invention is characterized for this purpose in that the piston in the damper is arranged on a piston rod which extends through the cylinder portion of the damper, so that upon relative movement between the piston and the cylinder portion, the volume of the damper filled with pressure medium remains constant.

20 Claims, 2 Drawing Sheets

ARRANGEMENTS FOR DAMPING SHIFTING MOVEMENTS IN TRANSMISSIONS

This is a continuation of application Ser. No. 004,311, filed Jan. 7, 1987, now abandoned, which is a continuation of Ser. No. 746,329, filed June 19, 1985, now abandoned.

The present invention relates to an arrangement for damping shifting movements in a mechanical, synchronized, multispeed transmission, in which a shifting movement can be at least partially effected by a pressure medium-controlled shifting cylinder, for example a pneumatic piston-cylinder unit which upon selection of the various gear speeds effects movements in two directions opposite to each other, a damper in the form of a piston cylinder unit filled with pressure medium being coupled to means transmitting the shifting movements in order to damp the engagement movements for a respective gear speed.

The above type of transmissison included in a vehicle drive unit is traditionally intended for manual shifting, after a main clutch has been made to break the torque transmission from an internal combustion engine included in the drive unit. In heavy highway vehicles, large forces are transmitted through the transmission, making it necessary to provide the components of the transmission with relatively thick dimensions in order to withstand the stresses. The inertial forces arising in the rotating components must be absorbed during the synchronizing phase of the shifting operation, thus making manual shifting difficult. For this reason a number of designs have been developed for automation of the work of shifting, so that only the actuation of the shifting operation takes place manually. In principle, the designs work satisfactorily, but problems have arisen in maintaining a satisfactory useful lift in those components in the transmission which interact during the shifting operation. The problems derive from difficulties in imitating with a servo device, a compressed air cylinder for example, the movement performed when an experienced driver performs a shifting operation, particularly engaging a gear. These problems have resulted in damaged tooth flanks on those gears which are pushed with gear force into engagement with each other during shifting.

To remedy these problems, it has been suggested previously to introduce a damper for damping gear shifting movements. The damper consisting of a piston cylinder unit filled with hydraulic fluid, with the piston fixed to one end of a piston rod, the desired damping was achieved by cooperation with a separate fluid reservoir via constricted and non-constricted ducts. This solution involves, however, the risk of foaming of the fluid in the system and consequently the risk of malfunctioning due to the loss of damping.

The present invention intends to provide a damper which eliminates said problems. The damper according to the invention consists of a pressure medium controlled piston cylinder unit coupled to means for transmitting the gear selection movement in order to dampen the engagement movements for the respective gear speed. The invention is characterized essentially in that the piston in the damper is arranged on a piston rod which extends through the cylinder portion so that upon relative movement between the piston and the cylinder portion, the volume of the damper filled with pressure medium remains constant.

By virtue of this arrangement damper need not communicate with an outside fluid reservoir, thus practically eliminating the risk of foaming.

In an advantageous embodiment of the invention, the piston in the damper cylinder is provided with throttle means through which pressure medium is caused to flow under constriction only when the piston is moving away from its neutral position.

Figure 3A:
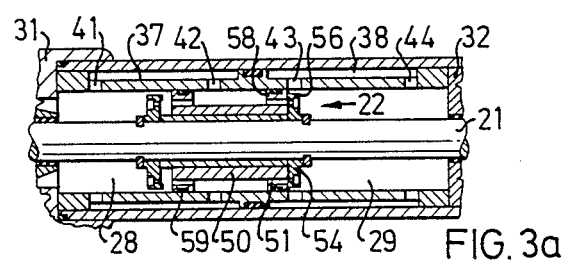
Figure 3B:
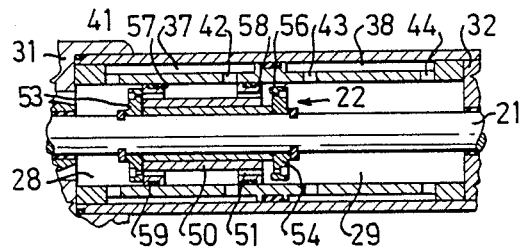

Other characteristic features of the invention are revealed in the accompanying claims and in the description below of an embodiment exemplifying the invention. The description refers to the accompanying drawings, of which FIG. 1 shows in a schematic plan view a shifting arrangement in a vehicle drive unit, FIG. 2 shows a longitudinal section through a damper according to the invention, and FIGS. 3a and 3b show the piston in the damper according to FIG. 2 at various stages of the shifting movement.

Figure 2:
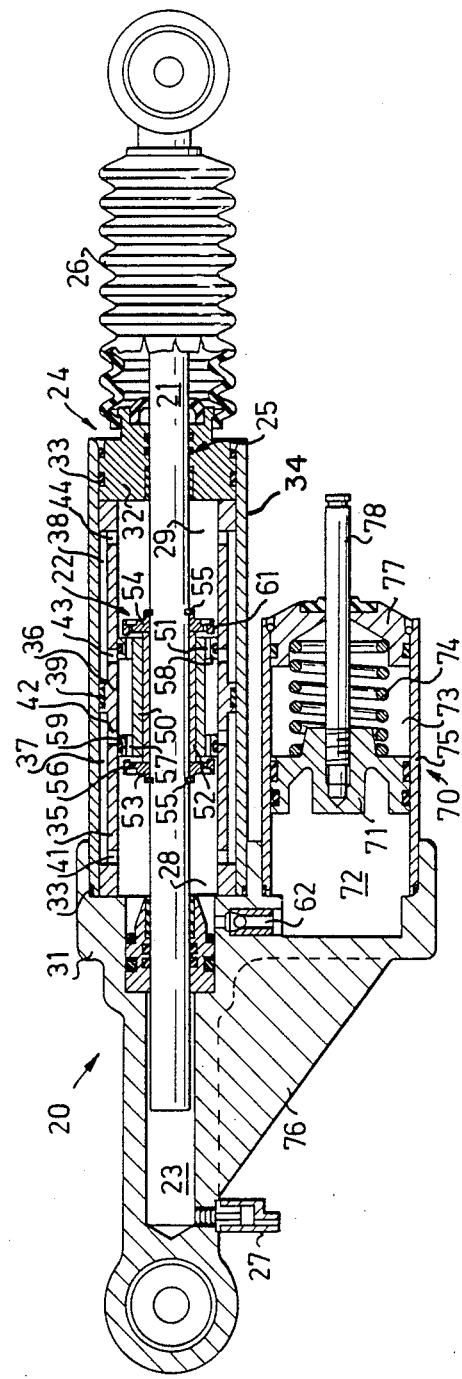

A drive unit shown in FIG. 1 for a heavy highway vehicle comprises an internal combustion engine 1, a mechanical main clutch 2 and a transmission 3 which via a central gearing 4 transmits the driving force to the driven axle 5 of the vehicle. The engine 1 consists suitably of a diesel engine and the main clutch 2 is preferably a single or double disc clutch, which, with the aid of pneumatic and/or hydraulic servo means (not shown), is operated manually or automatically for engagement and disengagement of torque transmission between the engine 1 and the transmission 3. If the clutch 2 is operated automatically, this is taken care of by a control system (not shown) in a manner which is known per se, and which will not be described in more detail here.

The transmission 3 is of the multispeed type with one or more shafts on which a number of different gears are brought into engagement with each other during during shifting. Preferably, the teeth only engage when the speeds of the gears in question have been substantially synchronized by means of a usual synchronizing device, comprising for example a conical friction clutch.

Gear shifting is effected by a pneumatic transversely oriented cylinder 9 and a pneumatic longitudinally oriented cylinder 10, the latter being also called the shift cylinder. These cylinders 9,10 are arranged to automatically perform the movements which would otherwise, in a manually shifted transmission, be performed by the driver via a shift lever (not shown). The longitudinal cylinder 10 produces an engagement movement from a neutral postion to a position for gear engagement and in the opposite direction a disengaging movement from a position for gear engagement to the neutral position. The engagement movements to the various gears will be effected in both directions from the neutral position, as will the disengagement movements towards the neutral position. During the engagement movement, a synchronizing mechanism can be actuated in a manner known per se, substantially equalizing, prior to engagement, the rotational speeds of the gears to be engaged with each other.

To transmit the longitudinal stroke from the cylinder 10, its piston rod is articulated to a lever 12 which is solidly joined to a transverse shaft 13, whereby the longitudinal movement is converted into a rotational movement of the transverse shaft 13. In a gear housing 14 such rotational movements of the transverse shaft 13 displace shifting forks (not shown) in the transmission 3 for engagement and disengagement of the various gears.

Compressed air is directed to the cylinders 9,10 for carrying out the operations via tubes 16, by means of a control unit 15 in a manner which is previously known and is therefore not described in more detail here. Electrical wires 17 from the engagement housing 14 to the control unit 15 send signals indicating the engaged gear.

To the lever 12 non-rotatably mounted on the transverse shaft 13 there is attached a shifting damper 20 according to the invention. As can be seen in FIG. 2, the damper 20 consists of a piston cylinder unit with a piston rod 21, one end of said unit being articulated to the lever 12. The protruding end of the piston rod 21 is, together with the end of the cylinder 10, fixed to the transmission housing 3 via a common bracket 19 or the like.

The piston rod 21 of the damper 20 is provided with a piston 22 whose position is fixed on the rod 21. When the piston 22 assumes its centre position in the damper 20 in accordance with FIG. 2, the piston 22 separates two chambers 28,29 in the cylinder 24 of essentially the same volume. The entire cylinder space 24 in the damper 20 is completely filled with hydraulic fluid and the piston rod 21 is sealed relative to the cylinder chambers 28,29 in the damper by means of seals 25. The major portion of the part of the piston rod 21 lying outside the cylinder 24 is protected by a concertinotype cover 26. The opposite end of the piston rod 21 moves in an air-filled cylindrical chamber 23 which is formed in a damper housing 76. The chamber 23 is arranged to communicate with the atmosphere via a dirtblocking connection 27.

The cylinder 24 is provided at its respective ends with two end wall portions 31 and 32, each of which engage in and are fixed to a cylindrical intermediate portion 34. Between the end portions 31,32 there is held by axial pressure an inner tubular cylinder 35. On either side of the centre portion 36 of the inner tube 35 there are spaces 37 and 38 between the inner tube 35 and the outer cylindrical intermediate portion 34. Said spaces 37, 38 serve as communication channels between two axially separated openings 41,42 and 43,44 in the inner tube 35. The centre portion 36 of the inner tube 35 is sealed by means of an O-ring 39 against the outer wall 34, thus preventing direct communication between the spaces 37, 38. The outer tube 34 is also sealed against the cylinder end walls 31,32 by means of O-rings 33.

The piston 22 on the piston rod 21 has throttle means, comprising a sleeve 50 limitedly displaceable relative to the piston rod 21 and sealed against the inner tube 35. The movement of the sleeve 50 is limited by two constriction rings 53,54 axially separated by a spacer sleeve 52. Each of these constriction rings is secured axially to the piston rod 21 by means of a lock ring 55. Each constriction ring 53,54 is provided with a plurality of essentially axial constrictions 56. The sleeve 50 is provided at each end with a radial flange 57,58 or the like, which is sealed against the inner wall by means of a piston ring 59. Each flange 57,58 has axial throughholes 51 for free flow of hydraulic fluid. Each ring 53,54 is also provided with an axially directed abutment 61, which in contact with the sleeve flange 57,58 seals against radial flow outside the ring 53,54. Thus all the flow is forced through the constriction 56 when there is contact between the respective ring 53, 54 and the flange 57, 58.

In the damper 20 shown in FIG. 2, the hydraulic fluid enclosed therein is subjected to a continuous over-pressure pressure by a pressure unit via a nipple 62 with a non-return valve. The pressure unit consists of a piston cylinder unit 70 mounted directly in the damper housing 76. The piston 71 therein separates a fluid-filled chamber 72 from a chamber 73 which has a compression spring 74 mounted therein. The fluid-filled chamber 72 is in direct communication with the nipple 62 of the damper 20. The cylinder 75 of the pressure unit 70 is at one end screwed into the damper housing 76 and at the other end, the cylinder 75 is closed by an end wall 77, through which a piston rod 78 extends, which normally extends substantially outside the end wall 77, as an indication that the damper 20 is not leaking hydraulic fluid. If leakage should occur, the piston rod 78 will be retracted into the pressure unit 70, thus indicating said leakage. The position of the piston rod 78 can of course also be determined by a sensor for suitable electrical indication of leakage.

The damper functions as follows. When the transmission 3 is in its neutral position, i.e. when no forces are transmitted through it, the longitudinal cylinder 10 also assumes a neutral position and the piston 22 of the damper 20 assumes its central position, as shown in FIG. 2. In this position there is free communication between the cylinder chambers 28,29 on both sides of the piston 22 via the apertures 41-44 and the spaces 37,38. If engagement of a gear is initiated by the longitudinal cylinder 10, the piston 22 of the damper 20 is displaced from the neutral position towards cylinder end wall 31. The ring 54 will then move into contact with the flange 58. The sleeve 50 is then moved along with the piston 22 and after a short distance, corresponding essentially to the axial width of the aperture 43, the relative positions shown in FIG. 3a are achieved, there being in this case no longer free communication between the chambers 28,29 via the apertures 41-44 and the spaces 37,38. The fluid is then forced through the constrictions 56 during the continued movement of the piston 22 for gear engagement. This produces the desired damping during the gear engagement movement.

When the gear has been engaged, th episton 22 will be in a position where the flanges 58,58 of the sleeve 50 are close to the apertures 42 and 41. When disengagement is initiaed, the ring 53 is immediately displaced into contact with the flange 57 (see FIG. 3b), and there will be no flow through the constrictions 56, since the flange 58 is no longer in contact with the ring 54. This permits free flow past the ring 54 and through the free-flow hole 51 in the flange 58, so that fluid from the chamber 29 can flow on via the aperture 42, the space 37 and the aperture 41 to the chamber 28.

The damper 20 functions correspondingly when its piston 22 for gear engagement and disengagement moves in the opposite direction in relation to the above described movements. The functioning of the damper 20 is affected by the axial spacing between the centres of the apertures 41-44 and how these spacings have been selected in relation to the distance which the piston 22 moves during gear shifting. The distance between the central apertures 42,43 should thus be equal to or slightly less than the distance which the piston 22 moves during engagement of a gear. This means that when a gear is fully engaged, the piston 22 will be in an end position where one of the flanges 57,58 of the sleeve 50 will be positioned slightly inside the aperture 42 or 43, as the case may be. The distance between the piston rings 59 on the flanges 57,58 should also only slightly exceed the distance between the apertures 42,43, so that, in the neutral position, the piston rings 59 will lie immediately outside their respective apertures 42,43. This produces a damping as soon as possible after the gear selection movement has been initiated. Furthermore, the axial spacing between the pairs of aperture 41,42 and 43,44, respectively, connected by the spaces 37 and 38, respectively, should slightly exceed said gear engagement distance so that the flange 57 or 58, respectively, when the gear is in engagement, will be situated slightly inside the aperture 41 or 44, respectively.

Essential to the invention is that the damper 20 functions entirely without communication with a separate non-pressurized fluid reservoir. This is made possible by the fact that the damper is made with a piston rod 21 which extends through and beyond the fluid cylinder, thus maintaining a constant volume in the fluid-holding space in the damper during the shifting movements. The pressure unit 70 does not affect the functioning of the damper during the shifting movements. It only guarantees that the fluid volume enclosed in the damper 20 will be kept under a certain overpressure. This avoids the formation of air bubbles in the fluid at the same time as the damper's 20 seals will not be subjected to varying overpressures and underpressures, thus increasing the effectiveness and life of the seals.

The above described example of the invention does not in any way delimit the invention, which can be modified in a number of embodiments within the scope of the following patent claims.

I claim:

1. Apparatus for damping shifting movements in a mechanical, synchronized multispeed transmission in a driving unit for vehicles, in which transmission a shifting movement is effected by a pressure-medium controlled shifting cylinder which, for engagement of the various gear speeds, effects movements in two directions opposite to each other, said apparatus including a damper comprising a piston in a pressuremedium-filled cylinder portion, said damper being coupled to means transmitting the shifting movements, in order to damp the engagement movements for the respective gear speed, the piston being arranged on a piston rod which extends through both ends of the cylinder portion so that there exists a pressure medium chamber on each side of the piston; fluid communication means including flow passages in the piston and through the wall of the cylinder, said flow passages being arranged such that there is established free communication through the piston between said chambers when the piston is in a neutral, center position in the cylinder portion whereby upon relative movement between the piston and the cylinder portion the damper has a pressure medium filled volume which remains constant, said fluid communication means further including means for throttling the flow of pressure medium through the piston only when the piston is moving away from its neutral position in the cylinder portion whereby the piston and thereby the shifting movement is damped only when the piston is moved away from the neutral position.

2. Arrangement according to claim 1, characterized in that the damper is included in a housing separate from the shifting cylinder.

3. Arrangement according to claim 1, characterized in that the cylinder portion has a cylinder wall which is provided with four axially spaced apertures, which are symmetrically arranged relative to the neutral position of the piston, communication being established via individual connecting channels in the cylinder wall, only between apertures arranged in pairs on either side of the neutral position.

4. Arrangement according to claim 1, characterized in that the throttling means comprises two axially spaced throttle elements securely mounted on the piston rod, said elements lying outside the central apertures in the cylinder wall when the piston is in the neutral position.

5. Arrangement according to claim 4, characterized in that each throttle element includes a ring provided with at least one axial constriction, that between the rings there is arranged an axially freely displaceable sleeve which has at each end a flange, which has seals for sealing contact with the lateral wall of the cylinder portion, and that at least one axial free-flow hole is arranged in each flange.

6. Arrangement according to claim 4, characterized in that the axial spacing between the central apertures is equal to or slightly less than the distance which the piston is moved during gear engagement from the neutral position to a position where the gear is engaged.

7. Arrangement according to claim 5, characterized in that the axial spacings between the apertures connected in pairs, as well as the axial spacing between the seals of the flanges against the cylinder wall slightly exceed said gear engagement distance.

8. Arrangement according to claim 1, characterized in that the damper is filled with hydraulic fluid, which is under continual overpressure from a pressure unit securely fixed to the damper.

9. Arrangement according to claim 8, characterized in that leakage from the damper is indicated by the relative position of a piston in the pressure unit.

10. Apparatus for damping shifting movements in a mechanical, synchronized multispeed transmission in a driving unit for vehicles, in which transmission a shifting is at least partially effected by a pressure-medium controlled shifting cylinder which, for engagement of the various gear speeds, effects movements in two directions opposite to each other, said apparatus including a damper comprising a piston in a pressure-medium filled cylinder portion, said damper being coupled to means transmitting the shifting movements, in order to damp the engagement movements for the respective gear speed, the piston being arranged on a piston rod which extends through both ends of the cylinder portion so that there exists a pressure medium chamber on each side of the piston; fluid communication means including flow passages in the piston and through the wall of the cylinder, said flow passages being arranged such that there is established free communication through the piston between said chambers when the piston is in a neutral, center position in the cylinder portion whereby the damper has a pressure-medium filled volume which remains constant upon relative movement between the piston and the cylinder portion, said fluid communication means including first, second, third and fourth axially spaced apertures symmetrically arranged relative to the neutral position of the piston such that the first and second apertures lie on one side of said neutral position and the third and fourth apertures lie on the other side of said neutral position and such that the second and fourth apertures are centrally located with respect to said first and third apertures, said fluid communication means further including connecting passages associated with said apertures, said connecting passages lying outside the interior space within the cylinder portion, said fluid communication means further including means for throttling the flow of pressuremedium through the piston only when the piston moves away from its neutral position, the throttling means comprising two axially spaced throttle elements securely mounted on the piston rod, said elements having restricted flow passages therethrough and said elements lying outside the second and fourth apertures in the cylinder wall when the piston is in the neutral position, said elements throttling pressure-medium flowing through the piston only when the piston is moving away from the neutral position in the cylinder portion whereby the piston and thereby the shifting movement is damped only when the piston is moved away from the neutral position.

11. Arrangement according to claim 10, characterized in that each throttle element includes a ring provided with at least one axial flow constriction, that between the rings there is arranged an axially freely displaceable sleeve which has at each end a flange, which has seals for sealing contact with the lateral wall of the cylinder portion, and that at least one axial free-flow hole is arranged in each flange.

12. Arrangement according to claim 10, characterized in that the axial spacing between the central apertures is equal to or slightly less than the distance which the piston is moved during gear engagement from the neutral position to a position where the gear is engaged.

13. Arrangement according to claim 11, characterized in that the axial spacings between the apertures connected in pairs, as well as the axial spacing between the seals of the flanges against the cylinder wall slightly exceed said gear engagement distance.

14. Arrangement according to claim 10, characterized in that the damper is filled with hydraulic fluid, which is under continual overpressure from a pressure unit securely fixed to the damper.

15. Arrangement according to claim 14, characterized in that leakage from the damper is indicated by the relative position of a piston in the pressure unit.

16. Arrangement according to claim 10, characterized in that the damper is included in a housing separate from the shifting cylinder.

17. Arrangement for damping shifting movements in a mechanical, synchronized multispeed transmission in a driving unit for vehicles, in which transmission a shifting movement can be at least partially effected by a pressure-medium controlled shifting cylinder which, for engagement of the various gear speeds, effects movements in two directions opposite to each other, a damper comprising a piston in a cylinder and being filled with pressure-medium and coupled to means transmitting the shifting movements, in order to damp the engagement movements for the respective gear speed, said damper cylinder including an inner fixed tubular member and said damper piston including a sleeve surrounding a piston rod which extends through the ends of said cylinder in both directions, said sleeve having end flanges which sealing slide within said tubular member during axial movement of said piston, said sleeve being axially slidable on said piston rod between two stop members carried by said piston rod, here being a pressure medium filled chamber on each side of said piston, means providing free communication between said chambers when said piston is in a center position in said cylinder, said means including openings in said tubular member which provide for flow of pressure-medium from one of said chambers through an annular space between said tubular member and said cylinder to the other chamber, the arrangement being such that upon axial movement of said piston in either direction said flanges block respective openings in said tubular member thereby preventing said free flow between said chambers, each of said flanges having at least one axial flow hole therethrough and each respective stop means having at least one constricted axial flow hole which cooperates with the axial flow hole in the respective flange when said piston moves away from its center position in a given direction to allow restricted flow of pressure medium from one of said chambers to the other, whereby said piston and hence the shifting movement is damped only when said piston is moved away from its center position.

18. Arrangement as in claim 17 wherein the damper is included in a housing separate from the shifting cylinder.

19. Arrangement as in claim 17 wherein the damper is filled with hydraulic fluid, which is under continual overpressure from a pressure unit securely fixed to the damper.

20. Arrangement as in claim 19 wherein leakage from the damper is indicated by the relative position of a piston on the pressure unit.

* * * * *